Feb. 28, 1950        K. A. SIMONS        2,499,116

TESTER FOR SELF-SYNCHRONOUS SYSTEMS

Filed Jan. 22, 1946

INVENTOR.
KENNETH A. SIMONS.

ATTORNEY

Patented Feb. 28, 1950

2,499,116

UNITED STATES PATENT OFFICE 2,499,116

TESTER FOR SELF-SYNCHRONOUS SYSTEMS

Kenneth A. Simons, Bryn Athyn, Pa., assignor to Radio Corporation of America, a corporation of Delaware Application January 22, 1946, Serial No. 642,691

6 Claims. (Cl. 177—311)

The present invention relates to testing apparatus and more particularly to a device for testing self-synchronous units variously known as Synchros, Selsyns, Autosyns, or Teleindicators.

An object of the invention is to provide a simple, inexpensive means for testing and trouble shooting electrical systems of the self-synchronous type.

Another object is to provide a testing unit wherein provision is made for connecting it to a self-synchronous system to indicate the relative angular relation of the rotor and stator of the system.

A further object is to provide a testing unit having lamps respectively arranged for indicating a number of angular positions being transmitted by a Synchro system.

Further objects will appear hereinafter.

Figure 1:
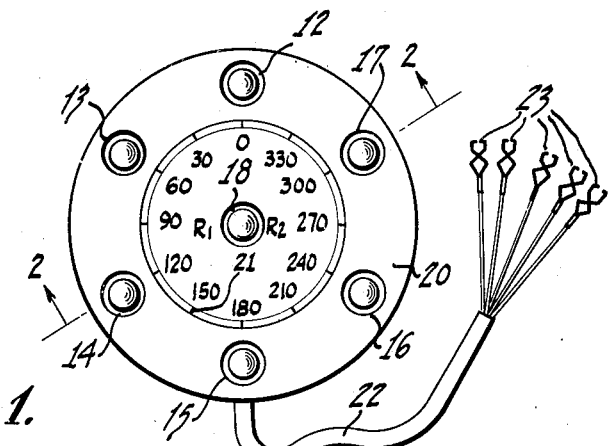
Figure 2:
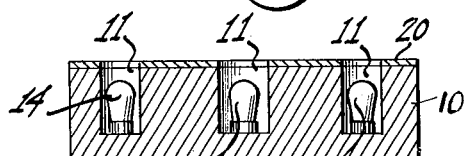
Figure 3:
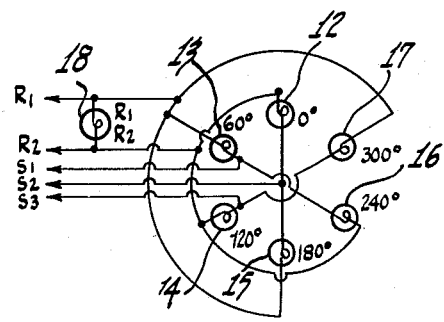
Figure 4:
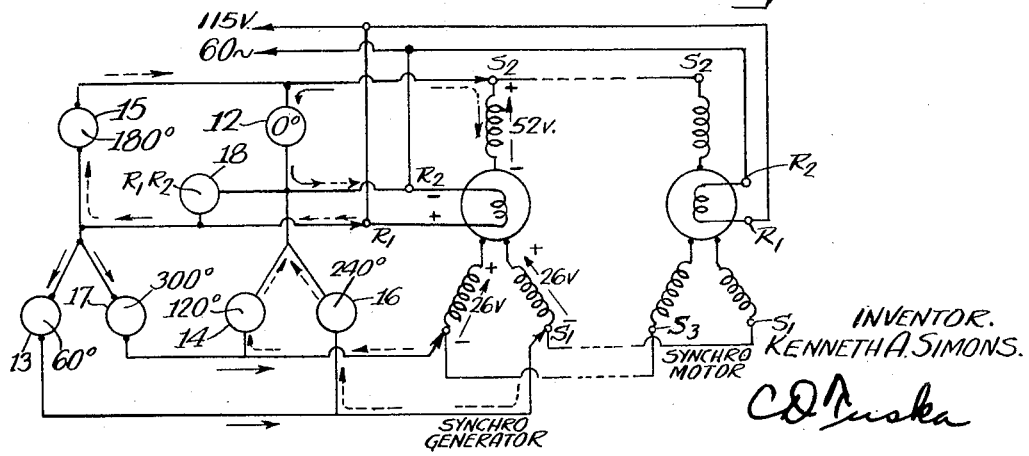

In the accompanying drawings, Fig. 1 represents a plan of a tester for Synchro systems embodying one form of the present invention; Fig. 2 represents a section on line 2—2 of Fig. 1; Fig. 3 is a circuit diagram of the tester shown in Figs. 1 and 2; and Fig. 4 is a circuit illustrating one operating condition of the tester.

Referring to the drawings, one form of the present invention comprises a housing 10 provided with a plurality of receptacles 11 for respectively housing a plurality of indicating lamps, identified respectively by reference numerals 12, 13, 14, 15, 16, 17, and 18. The lamps 12 to 17 inclusive are arranged preferably as an annular series encircling the lamp 18 as a center. As shown, the series of lamps are spaced sixty degrees apart with the lamp 12 in register with the zero position; lamp 13 in register with the sixty degree position; lamp 14 in register with the one hundred and twenty degree position; lamp 15 in register with the one hundred and eighty degree position; the lamp 16 in register with the two hundred and forty degree position; and the lamp 17 in register with the three hundred degree position. Thus, each lamp of the annular series designates one angular position being transmitted by the system. The lamp 18 is preferably in parallel with the rotor leads $R^1$ and $R^2$ and is consequently brightly lighted as an indication of normal $R^1$-$R^2$ voltage. An apertured cover 20 is fitted upon the base 10 so that each lamp is visible in relation to the angular position it indicates, and to that end a scale 21 is engaged or otherwise operatively located for proper angular positions of the respective lamps.

In order to connect the tester of the invention to any self-synchronous system, a multi-wire cable 22 leads from the base unit and comprises five leads terminating respectively in clips 23 for attachment to the rotor coil ends $R^1$ and $R^2$ and to the respective stator coils $S^1$, $S^2$ and $S^3$. The circuit arrangement of the leads with respect to the lamp circuits is shown in Fig. 3.

When the aforesaid cable wires of the tester are connected to the five wires of a Synchro system, the lamp 18 lights up brilliantly, indicating normal $R^1$-$R^2$ voltage, and the other lamps light up in away which indicates the approximate angular position being transmitted by the system. For example, the "0°" lamp 12 lights most brightly when 0° is being sent through the system. The "0°" lamp 12 and the "60°" lamp 13 will light brightly and equally when 30° is being sent through, and so on for the different angular positions. By reference to the illustrative circuit of Fig. 4, the operation may be understood by considering the conditions that exist when "0°" signal is applied to the tester. Under these conditions, there are 78 volts between $S_2$ and either $S_1$ or $S_3$ and there is no voltage between $S^1$ and $S^3$ so that any current tending to flow from $S_2$ to $S_3$ and $S_1$ through the "0°" lamp 12 and the "60°" lamp 13 and "300°" lamp 17 in parallel (as shown by the solid arrow) flows through two voltage sources which add to produce a total of 78 plus 115 or 193 volts. Current tending to flow through the "180°" lamp 15 and the "120°" lamp 14 and "240°" lamp 16 in parallel (shown by the dotted arrows) flows through two sources which subtract, giving a total of 115 minus 78, or 37 volts. As a result, the "0°" lamp 12 lights brightly, the "60°" lamp 13 and "300°" lamp 17 lights equally and dimly and the "180°" lamp 15 hardly lights at all. The same explanation applies to any of the angular positions corresponding to a lamp designation. For position intermediate the lamps change gradually from one condition to the next.

Figure 4 of the drawing shows that the 78 volt source is the voltage developed between the terminals $S_2$ and $S_3$ or $S_2$ and $S_1$ of the Synchro-generator using the conventional nomenclature. For convenience, the relative instantaneous polarities have been shown. Thus, it will be seen that, in the zero position, the rotor is alined with the $S_2$ field coil so that the maximum voltage is induced in this coil. Conventional equipment is designed so that this voltage is equal to approximately 52 volts, and, at the instant considered, terminal $S_2$ is considered as being positive. Because the coils $S_3$ and $S_1$ are at an angle to the rotor, the induced voltages are approximately 26 volts, and the terminals $S_3$ and $S_1$ will be negative. Consequently, there is effectively no voltage between $S_1$ and $S_3$ and these may be considered as directly connected together for this particular position of the rotor. However, between $S_3$ and $S_2$, the voltages are in phase. The sum of the 26 volts in the $S_3$ leg and the 52 volts in the $S_2$ leg produce the resultant 78 volts. Following the solid arrows in Fig. 4, beginning at $S_2$, for example, one direction of current flow is a series path through the "0°" lamp, the 115 volt source, and through the lamps for 60° and 300°, which are effectively connected in parallel, and back to $S_3$ and $S_1$ which are electrically identical points. This path includes the 115 volt source added in phase with the 78 volts across the Synchro-generator, and the 0° lamp will be illuminated most brilliantly, while the 60° and 300° lamps in parallel are each illuminated to one half the brilliancy of the 0° lamp. The excitation of the 180° lamp is obtained from the 115 volt source through a path, shown by the dotted arrows, from $R_1$, through the 180° lamp, the Synchro-generator (in phase opposition so that the voltages subtract, giving a resultant of 115—78=37 volts effective energizing potential), and back to $R_1$ through the lamps for 120° and 240° in parallel. Since the 37 volt current divides equally through the 120° and 240° lamps, they are one half as bright as the 180° lamp, or hardly illuminated at all. The 78 volt source is the "signal" voltage developed between $S_2$ and $S_3$, or $S_2$ and $S_1$ of the Synchro-generator. A complete Selsyn system comprises a Synchro-generator and a Synchro motor, as shown in Fig. 4 or on page 38 or 39 of "Ordnance Pamphlet No. 1303," a joint Bureau of Ordnance and Bureau of Ships Publication, December 15, 1944.

From the foregoing it will be apparent that a testing unit has been devised for Synchro systems wherein it is possible to estimate the value of the angle being transmitted by observing the illumination of the lamps. Any troubles therefore which occur in such a system can be rapidly located by observing the various abnormal lamp patterns which result.

Having thus described my invention, I claim:

1. A testing unit for self-synchronous systems, comprising a scale graduated in angular degrees, a plurality of lamps arranged respectively opposite selected graduations, means to mount said lamps for visual inspection, a plurality of electrical circuits respectively including the three stator windings of a Synchro generator, and an energizing circuit including the rotor of said generator, each of said electrical circuits including certain of said lamps and being energized by the voltage applied to said rotor combined with the voltages induced in said windings, said circuits being so arranged that the voltage induced at each angular position of said rotor corresponding to said selected graduations being applied to the lamps opposite any given graduation is a maximum when said rotor is in a corresponding position, whereby the position of said rotor with respect to said windings can be checked for accuracy.

2. A testing unit for self-synchronous systems, comprising a scale graduated in angular degrees, a plurality of lamps arranged respectively opposite selected graduations, means to mount said lamps for visual inspection, a plurality of electrical circuits respectively including the three stator windings of a Synchro generator, and an energizing circuit including the rotor of said generator, all of said circuits being supplied from a source of alternating current, each of said electrical circuits including certain of said lamps and being energized by the voltage applied to said rotor combined with the voltages induced in said windings, said circuits being so arranged that the voltage induced at each angular position of said rotor corresponding to said selected graduations being applied to the lamp opposite any given graduation is a maximum when said rotor is in a corresponding position, whereby the position of said rotor with respect to said windings can be checked for accuracy.

3. A testing unit for self-synchronous systems, comprising a scale graduated in angular degrees, a plurality of electrical circuits respectively including the three stator windings of a Synchro generator, and an energizing circuit including the rotor of said generator, all of said circuits being supplied from a source of alternating current, each of said electrical circuits including certain of said lamps and being energized by the voltage applied to said rotor combined with the voltages induced in said windings, the arrangement being such that when one stator circuit is energized by the rotor being in coincidence with a graduation the remaining two stator circuits will be energized by voltage of opposite phase to said one stator circuit, whereby the lamp corresponding to the coincident position of said rotor will be predominantly illuminated.

4. A testing unit for self-synchronous systems including a Synchro device having two rotor and three stator terminals comprising a scale graduated in angular degrees, a plurality of lamps arranged respectively opposite selected graduations, means to mount said lamps for visual inspection, a plurality of test leads for connection to the stator and rotor terminals of said device, respectively, one group of said lamps being connected between the test leads for connection to one of said rotor terminals and respective ones of the test leads for connection to the stator terminals, and another group of said lamps being connected between the test leads for connection to the other rotor terminal and respective ones of the test leads for connection to the stator terminals.

5. A device of the character described in claim 4 which includes one additional lamp connected between the test leads for connection to said rotor terminals.

6. A testing unit for self-synchronous systems which includes a Synchro device having rotor terminals $R_1$ and $R_2$ and stator terminals $S_1$, $S_2$ and $S_3$ comprising a scale graduated in angular degrees, six lamps arranged respectively opposite selected graduations, a plurality of test leads $R_1$, $R_2$, $S_1$, $S_2$ and $S_3$ for connection to said rotor and stator terminals, respectively, circuits connecting three of said lamps between test lead $R_1$ and test leads $S_1$, $S_2$ and $S_3$ respectively, circuits connecting the other three lamps between test lead $R_2$ and test leads $S_1$, $S_2$ and $S_3$, respectively, whereby the lamp corresponding to the angular position of the rotor of said device will be illuminated most brilliantly when said leads are connected to corresponding terminals of said device.

KENNETH A. SIMONS.

REFERENCES CITED

The following references are of record in the file of this patent:

UNITED STATES PATENTS

| Number | Name | Date |
|---|---|---|
| 1,375,437 | Akemann | Apr. 19, 1921 |
| 1,564,788 | Hildebrand | Dec. 8, 1925 |
| 2,098,002 | Guerin et al. | Nov. 2, 1937 |
| 2,283,103 | Stuart, Jr. | May 12, 1942 |